July 24, 1934.  G. D. MYERS ET AL  1,967,778
TIME SERVICE SYSTEM
Filed Aug. 31, 1932   6 Sheets-Sheet 1

July 24, 1934.　　G. D. MYERS ET AL　　1,967,778
TIME SERVICE SYSTEM
Filed Aug. 31, 1932　　6 Sheets-Sheet 2

Inventors
George Dalton Myers
Donald H. Myers
By Bogert & Bogert
Attorneys

July 24, 1934.　　G. D. MYERS ET AL　　1,967,778
TIME SERVICE SYSTEM
Filed Aug. 31, 1932　　6 Sheets-Sheet 3
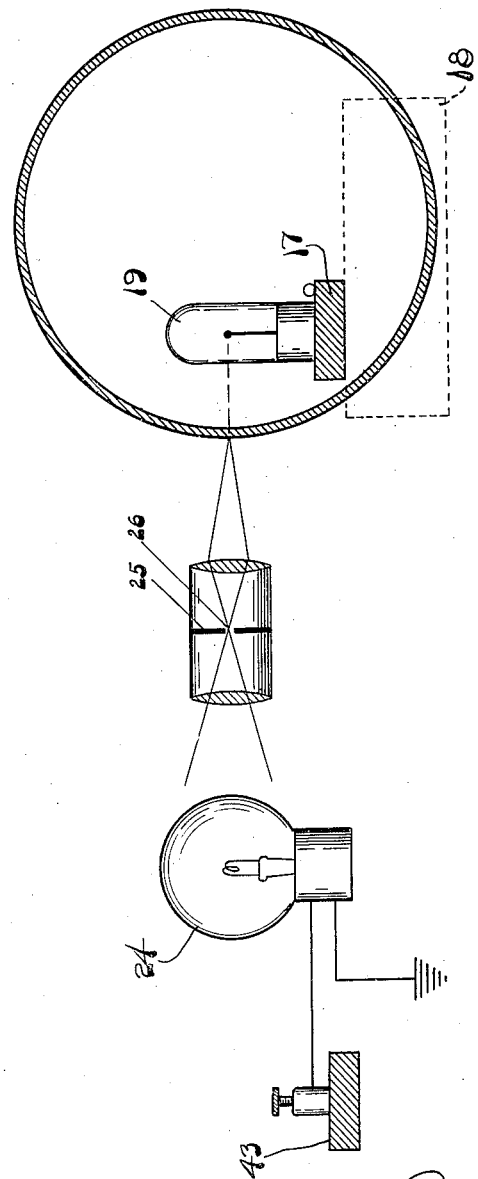

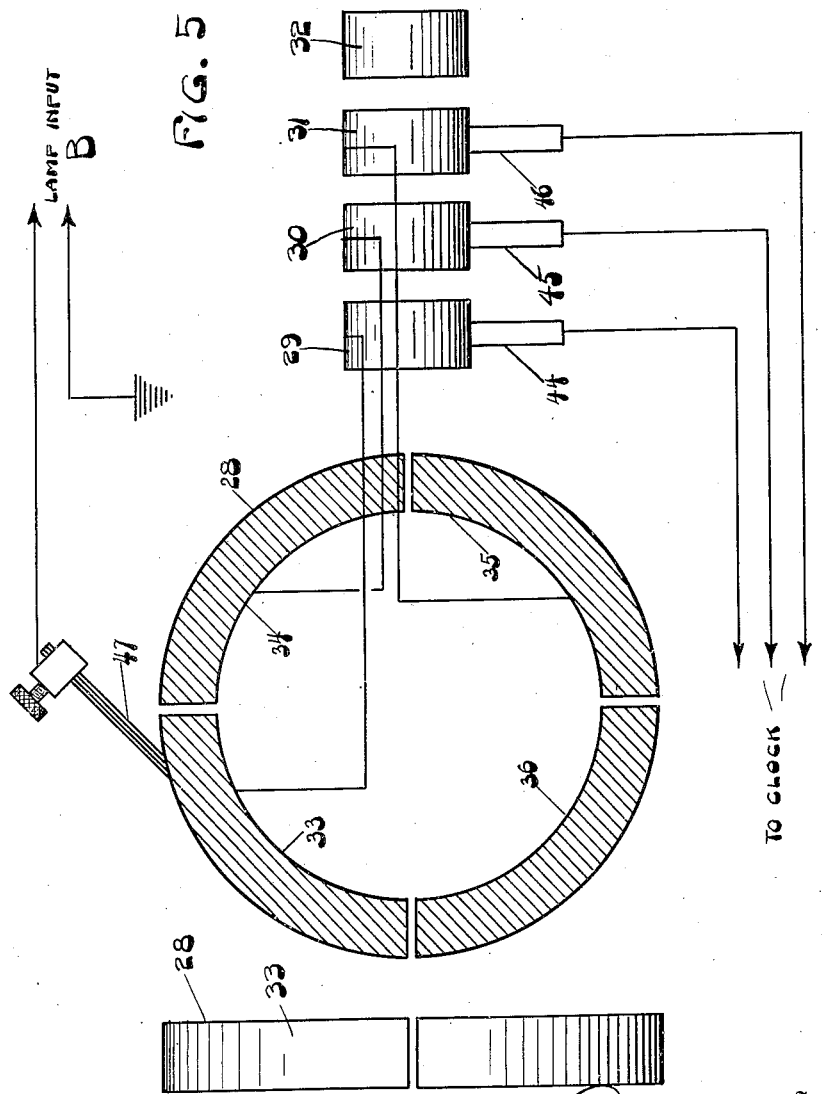

July 24, 1934.   G. D. MYERS ET AL   1,967,778
TIME SERVICE SYSTEM
Filed Aug. 31, 1932   6 Sheets-Sheet 5
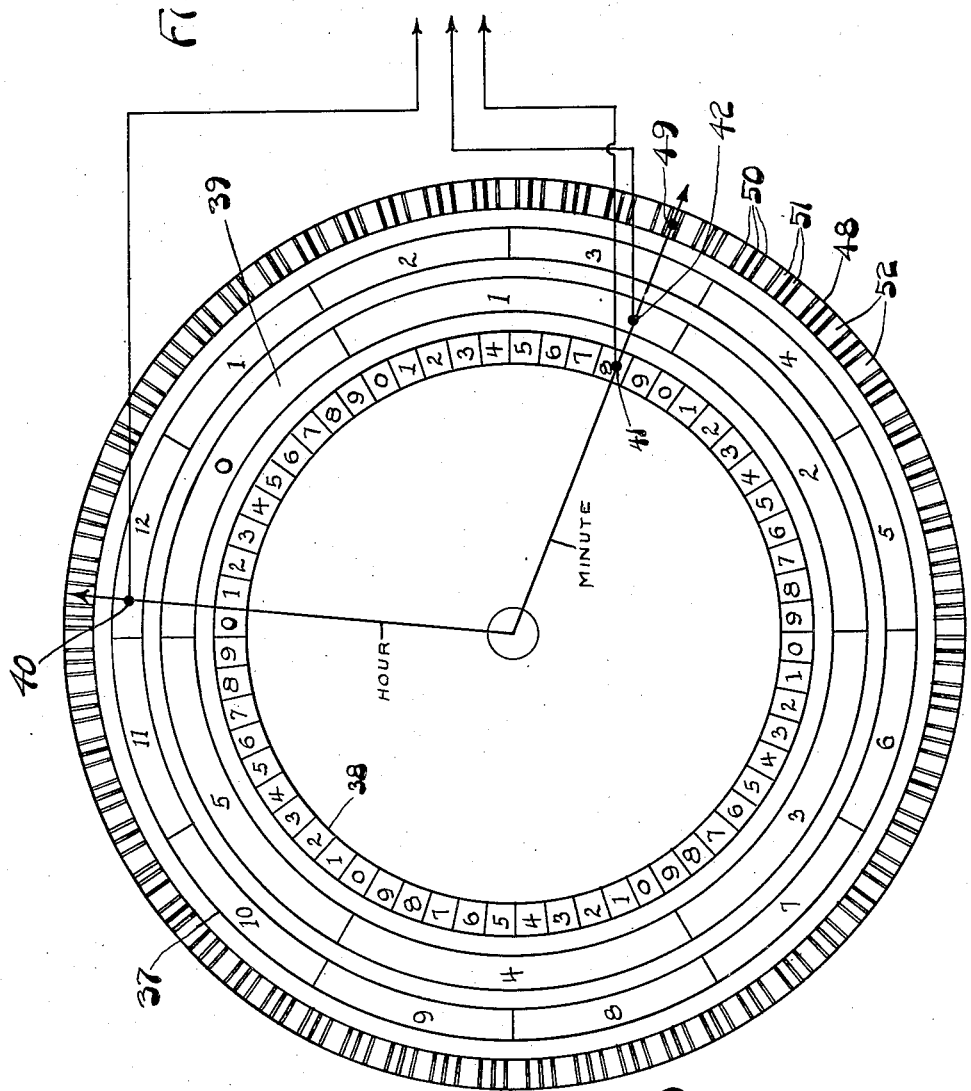

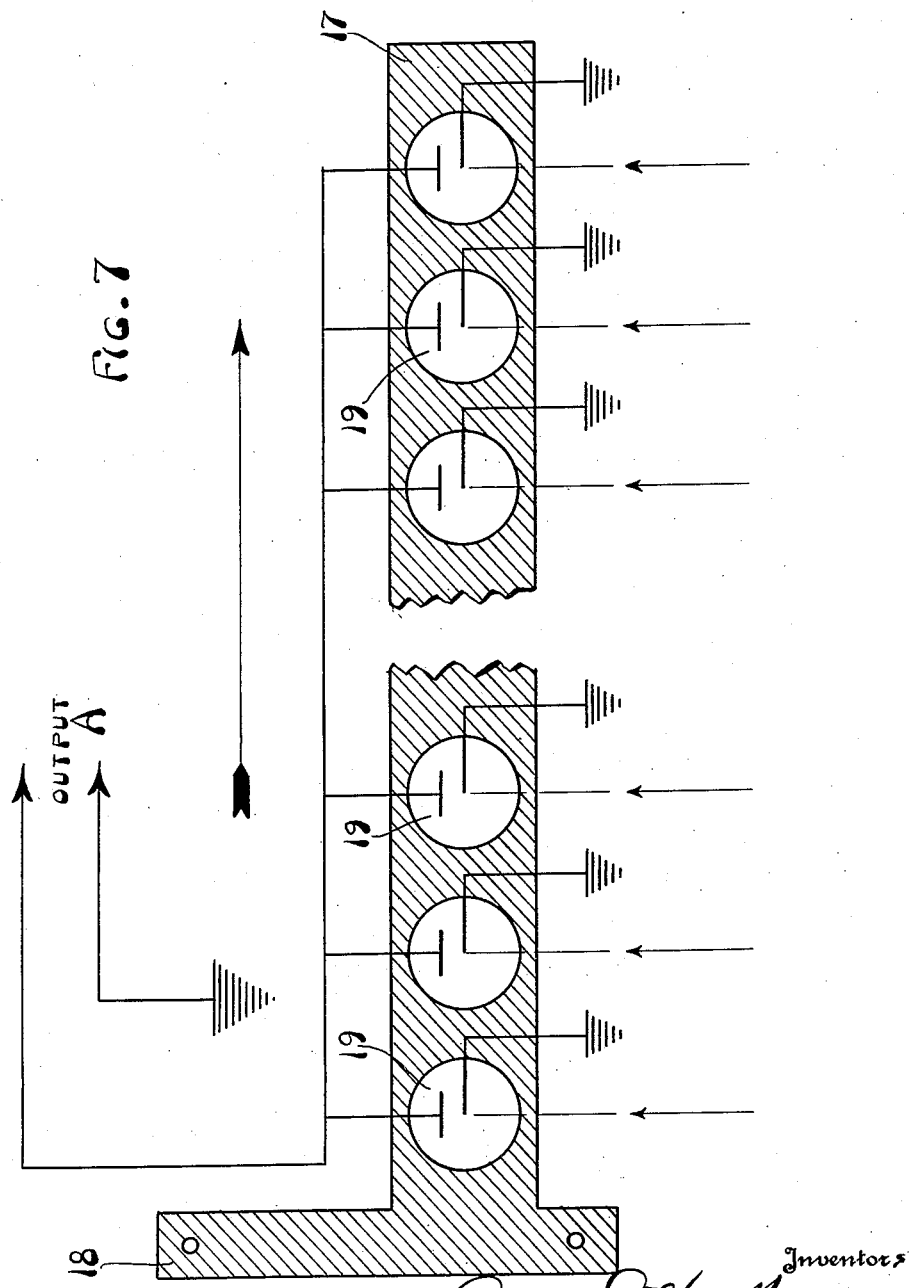

Patented July 24, 1934

1,967,778

UNITED STATES PATENT OFFICE 1,967,778

TIME SERVICE SYSTEM

George Dalton Myers and Donald H. Myers, Cincinnati, Ohio

Application August 31, 1932, Serial No. 631,197

2 Claims. (Cl. 179—6)

This invention is designed to afford a standard time service by way of a commercial telephone circuit.

An object of the invention is to produce an unique service in that a combined mechanical and electrical agency is employed for delivering the correct standard time at any instant, by voice rather than by signals of other characteristics.

A further object is to produce a time service for telephone systems which will function to convey the correct time by mechanical-electrical voice signals automatically, correctly, instantly and at any moment to give the correct time, without having to depend upon the human voice to convey the service to the subscriber.

These and other objects are attained in the time service system set forth in the following specification and disclosed in the accompanying drawings, in which:

Fig. 4 is a diagrammatic view showing the relation of the voice-track cylinder, the photo-electric cells within the cylinder, the sources of illumination, and the light-concentrating lens tubes which function to cause the voice tracks to function their cooperating photo-electric cells.

Fig. 5 is a diagrammatic view illustrating a commutator construction which we employ for rendering the proper photo-electric cells available at the right time for time telling purposes.

Fig. 6 is a diagrammatic view of the details embodied in the commutator clock which we employ as the actuating or functioning element of the system herein described.

Fig. 7 is a diagrammatic view showing the cell rack, cells, and cell connections employed in the invention we are about to describe.

Figure 1:
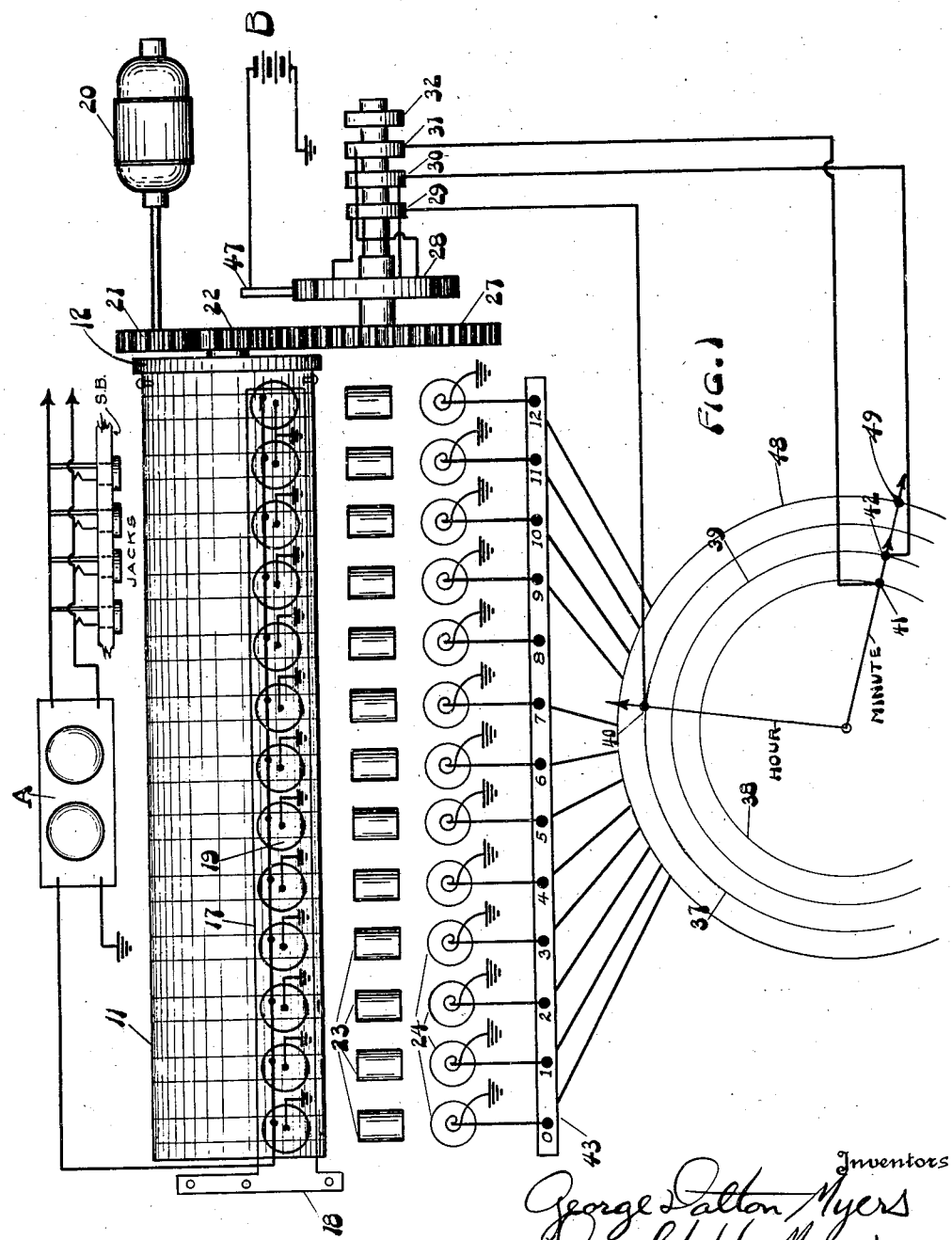
Fig. 1 is a diagrammatic view of the apparatus embodied in the time service system which we have invented.
Figure 2:
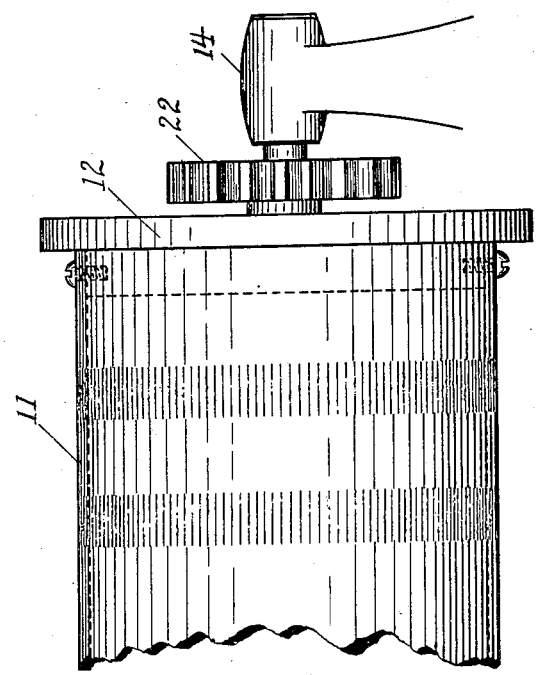
Fig. 2 is a side elevation of a portion of the voice-track cylinder which constitutes one of the principal elements of our invention.
Figure 3:
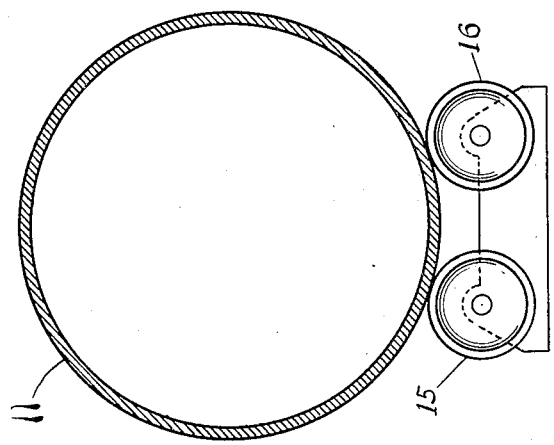
Fig. 3 is an end elevation disclosing the manner of mounting the voice-track cylinder at one end, and disclosing the manner in which the photo-electric cells which are employed as important elements of our invention, are located within the cylinders for cooperation with the voice sound tracks thereon.

The principal element of our invention consists of a hollow cylinder 11 which preferably is made of transparent material, such as glass, and which is mounted for suitable rotation upon its axis, one end of the cylinder 11 having a cap 12 to which a gear 22 is attached and mounted to rotate in a bearing 14 (see Fig. 2), the opposite end of the hollow cylinder being mounted to rotate preferably upon rollers 15 and 16 which support the open end of the cylinder so that its open end may be free for the purpose of receiving a rack 17 within the cylinder, as shown in Figs. 1, 2 and 4. This rack is provided with a suitable support at one end, as at 18, whereby it is held within the cylinder in a position to support its mounted photo-electric cells 19 in proper position relatively to the sound tracks on the cylinder as shown in Fig. 1, and to beams of light projected from suitable apparatus through the sound track and upon the cell, as will be explained, and as has been shown in Fig. 4. For the purpose of rotating this cylinder we have provided a suitable motor 20 which has a driving pinion 21 meshing with the gear 22 by means of which the cylinder is moved to bring the sound tracks between the beams of light and the photo-electric cells. A series of lens projector tubes 23 is suitably mounted outside the cylinder in a position to project concentrated beams of light upon the respective cells with which they may be associated, suitable sources of illumination, such as lamp bulbs 24, being provided to produce the beams of light projected from the lens tubes 23. This relationship which is shown diagrammatically in Fig. 4, is adapted, through a diaphragm 25 within each of the lens tubes, to produce a horizontal strip of light through a slit 26 in each diaphragm, so that the passage of the sound track of each associated group of elements, will function to create the desired response within the photo-electric cell, as is well known, and to which feature, in itself, applicants lay no claim. Thus, if each sound track is made to record a human voice which is speaking a certain numeral, as for example, the numeral 1, the numeral 2, etc., up to and including the numeral 12, we may then function the illumination of the lamps in the order desired, so that the photo-electric cells which may be connected with suitable amplifying apparatus, may be caused to become sensitive to the vibrations of the light occasioned by the passing of the sound tracks in their interception of the light beams projected from the tubes 23. Thus, with proper control mechanism, any numeral or group of numerals may be caused to be spoken audibly, as for example in telling the correct time as we have explained herein.

Meshing with cylinder driving gear 22 is a gear 27 which bears a 4 to 1 relationship with gear 22 thereby causing gear 27 to rotate but one-fourth the rotation of gear 22. Mounted on the shaft of gear 27 is a four-segment ring 28, these segments being metal and suitably insulated from each other, as shown in Fig. 5. In addition to this, we have provided, on the same shaft with segment ring 28, a series of metal rings 29, 30, 31 and 32, these rings being connected with the respective segments 33, 34, 35 and 36 of the segment ring. The purpose of the four contact rings 29, 30, 31 and 32, is as follows: ring 29 is connected with the hour-indicating mechanism of a contact or commutator clock which we have shown in Fig. 6 and which will be described presently in detail; ring 30 is connected with one of the segment rings of the commutator clock, which will be described, and which has been provided for the indication of the minute of the hour, ring 31 being connected with another segment ring of the commutator clock for cooperation with the second mentioned segment ring of the clock for indication of the minute, as will be described; contact ring 32 has been provided especially for giving fractional minute indications and signals which may indicate the termination of or pause between time announcements.

We now will describe the commutator clock which constitutes an important element of our invention. This clock may be of any suitable type, such for example as an electric clock of the secondary class which is functioned from a primary clock located at a source of time disbursement, such secondary clock operating upon the principle of the reception of impulses in order to advance the hands in a step by step motion about the dial of the clock, the hands bearing contacts or the clock having other suitable contacts moving in accordance with the positions of the hands, to function the apparatus described above, through suitable electrical connections which are shown in Fig. 1 and which will be set forth in the description of the operation of the system, which is to follow. The clock which is shown diagrammatically in Fig. 6, is provided with a suitable face or contact-bearing member, with four series of contacts or segments arranged in four groups constituting rings. The segments of the rings are insulated from each other so that there is no contact between adjacent segments and so that each segment will function independently of every other segment to perform its own distinct office. One segment ring 37 of the clock is composed of twelve segments which are insulated from each other. For convenience of understanding, these segments have been numbered on the face of each to correspond with the hour through which their function is to be performed. The inner segment ring 38 is composed of a series of sixty segments which are insulated from each other, and which are divided into six groups of ten segments each, the segments of each group being provided with numerals 0 to 9 inclusive. Between rings 37 and 38 is located segment ring 39 which is composed of six segments which are insulated from each other. For convenience of understanding, these segments have been numbered 0 to 5 inclusive. Inner ring 38, having sixty segments, represents the sixty minutes of each hour, one segment being provided for each minute. Cooperating with these segment rings is an outer segment ring 48 which may be termed the fractional minute ring in that its function is to enable the apparatus to announce the chosen fractional parts of the minute, as for example the quarters of each minute. Arranged to pass over these segment rings are the respective hour and minute contact arms or hands, these arms being designated respectively with the words "Hour" and "Minute". At the point where the hour hand or arm passes over the segment hour ring 37, we have provided a contact 40 which establishes contact between the arm and each of the segments in succession. The minute contact arm is provided with a contact 41 which passes over the successive group of minute segments 0 to 9 inclusive of each group. In addition to this, the minute arm is provided with a contact 42 which passes over the segments of contact ring 39 for cooperation with the minute segments of the ring 38, the function of this middle segment ring 39 to be explained shortly. A contact 49 on the minute arm engages the segments of the fractional minute segment ring 48 so as to function as will be explained.

Now, reference being had to both Figs. 1 and 6, we will describe how the commutator clock segments are connected into the system disclosed in Fig. 1, and the connection of hand contacts 40, 41, 42 and 49 therewith. Let us now call attention to the diagrammatic representation of the terminal board 43 to which the lamps 24 are connected as to one terminal of each, the other terminal of each of the lamps being suitably grounded as has been indicated diagrammatically. We have shown the diagrammatic terminals of this terminal strip 43 as having respective numbers 0 to 12 inclusive, corresponding thereby to the number of lamps, the number of lens tubes, the number of photo-electric cells, and the number of voice or sound tracks on the cylinder. Each of the zeros of the segment ring 38, six of which zeros will be found, is connected with terminal 0 to which the first one of the lamps 24 is connected as shown in Fig. 1. Upon inspection of the clock diagram disclosed in Fig. 6, it will be found that there is a total of eight segments which have been given the number "1". These segments are connected together and are passed to the terminal marked "1" on terminal board 43, to which the second of the lamps is connected. Inspection of the clock diagram will disclose that there are eight ring segments which have been given the number "2". In like manner, these segments "2" are connected together and are connected to terminal "2" of the terminal strip 43 to which the third of the lamps is connected. This same connection, or method of procedure, is employed throughout the entire number of ring segments on rings 37, 38 and 39, as well as lamps and lamp terminals, thereby accounting for each of the ring segments in the system, aside from those in ring 48. This now leaves arm contacts 40, 41 and 42 for disposition in the following manner. As has been explained, contact ring 29 is connected with segment 33 of the four-segment contact commutator 28. We now provide a brush 44 which lies in engagement with contact ring 29 and is connected with contact 40 of the "hour" contact arm. Ring 30, which is connected with segment 34 of commutator ring 28, is provided with a brush 45 having direct connection to contact 42 of the "minute" contact arm. Contact ring 31, which is connected to segment 35 of commutator ring 38, as shown in Fig. 5, is provided with a brush 46 which is connected with contact 41 of the "minute" contact hand. Referring again to Fig. 1, will be seen a source of electric potential indicated as "B" one terminal of which is connected with a brush 47 which engages the segments of commutator ring 28, the other terminal of which is grounded, thereby establishing circuit connections through the grounded terminals of the lamps 24 and through the clock contacts, segments, and connections which we have just described, with the lamps, whereby, as the commutator ring and its contact rings are rotated and when the hands of the clock move, successive contact with the clock segments will cause the lamps to become illuminated in a manner which will be described.

The photo-electric cells which function as light sensitive valves to permit the passage of current between their elements, as is well known, are connected together in parallel, conventional connection being established from these cells to a suitable amplifying apparatus "A", the output from which is connected with the spare jack of the usual telephone exchange switch board, it being well known practice to provide such switch boards with a number of jacks for use in connection with emergencies or such special apparatus, as well as additional service, such as our invention provides. We have shown one terminal of each photo-electric cell as well as one input terminal of the amplifier to be grounded merely for convenience of illustration, it being understood that no attempt is made herein to disclose connections which are well known in the art or to describe the functioning apparatus.

We now call attention to the voice or sound tracks on the cylinder 11. These tracks may be made a permanent part of the cylinder by coating the cylinder with a light-sensitive emulsion and then photographing these sound tracks in the proper position, after which the cylinder surface may be suitably developed out to make the sound tracks visible thereby causing them to operate as light-vibrating agencies for causing the cells 19 to function, or, after having been developed-out, the cylinder sound tracks may be directly etched into the cylinder surface and inlaid with a light impervious material, or, as another choice, the sound tracks may be produced on film, such as is employed in motion picture talking film, and then affixed to the surface of the cylinder in the proper position to impose the light-vibrating effect upon the light beam or beams being projected from the lens tubes 23. In any event, such sound tracks as are carried by the cylinder, being the recording of a human voice, are caused to speak or reproduce the speech which they have recorded. Therefore, in order that these sound or voice tracks may be caused to speak the proper numbers corresponding to the hour and minute of the hour, the sound tracks diagrammatically illustrated on the cylinder in Fig. 1, represent the recording of a voice speaking the numbers "0", "1", "2", "3", "4", "5", "6", "7", "8", "9", "10", "11", and "12".

At this time, before entering into a description of the functioning of the apparatus we will describe the fractional minute segment ring 48 and its functioning in cooperation with minute hand contact 49. This ring 48 has been shown as but exemplary of an added feature of our invention. This ring is designed to deliver the quarter minute announcements in some preferred manner as "one quarter", "one half", and "three quarters", spoken audibly, such announcements occurring upon the termination of each one quarter minute interval, except when the minute has terminated, at which time there is no announcement, the change from one minute to the next being indicated by a pause of greater duration than that which occurs between the quarter minute announcements.

The fractional minute segment ring construction consists of a series of alternating narrow metal contact segments 50 of the same width, and relatively wider insulation segments, the latter segments being of equal width between the three quarter minute announcements, as at 51, and of greater width between the announcement of the third quarter of an expiring minute and the announcement of the first quarter of a new minute, as at 52. Thus, when additional contact rings, such as suggested at 32, additional commutator segments of the type of 33 to 36 inclusive, and additional sound records, lens tubes, and lamps are connected into the system in some such manner as has been done in the connections to the hour and minute segment rings, the speaking of the first quarter, second quarter and third quarter of each minute will be accomplished, but, as has been said, there being an absence of any metal segment as 50 at the point of expiration of one minute and initiation of another minute, no signal other than a pause will be the indication of change from one minute to the next. No additional apparatus has been illustrated for the performance of this fractional minute announcement, other than the suggested form of the ring 48, because this would occasion mere repetition or duplication of the apparatus already shown for the announcement of the hour and minute of the hour, as now will be explained:

Assuming that the clock, as shown in Fig. 6, indicates the time as being 18 minutes after 12, such time being indicated by the positions of contact 42, segment 1 of contact ring 39, contact 41 of segment 8 of the second group of the minute ring 38, and contact 40 of segment 12 of the hour ring 37, the operation of the apparatus will be as follows:

First of all it must be understood that motor 20 is always operating to cause rotation of cylinder 11 and gears 11, 22 and 27, with the segment ring 28 and contact rings 29, 30, 31 and 32, throughout the 24 hour period of each day. In other words, the apparatus is continuously in motion at all times. Therefore, assuming the parts to be in the positions indicated in the several figures of the drawings, with brush 47 on segment 33 of ring 28 and brush 45 on ring 30 to which segment 34 is connected, contact 42 is connected with this brush 45, the first operation is to cause illumination of the lamp connected with terminal 1 of the terminal strip 43. This results in a beam of light being projected from the second lens tube and onto the sound track occupying the second position on cylinder 11. As has been stated, this second sound track is recorded to receive the single word "one". Due to the interception of the line variations of this sound track with the beam of light being projected from the second lens tube, the photoelectric cell occupying the second position on the rack 17, will impart to the amplifier A a sound reproduction which will be audible at the output of the amplifier as a continued repetition of the word "one". In as much as each sound track is provided for but one speaking of the number as recorded, for each revolution of the cylinder 11, and in as much as segment ring 28 will rotate through but one fourth of a revolution because of the four to one ratio of gears 22 and 27, each of the segments 33, 34, 35 and 36 of the segment ring occupying but one fourth of the circumference of the ring, the word "one" will be spoken but once, because segment 34 which controls the illumination of the second of the lamps 24 at the time contact 42 occupies number 1 segment of the middle segment ring 39 of the clock, will have passed beyond engagement with brush 47 with which the source of electric potential B is connected. Therefore, the lamp will cease to glow and the corresponding lens tube will cease to project a beam of light therefrom, in consequence of which the associated photoelectric cell will cease to be affected by the light vibrations created by the second sound track on the cylinder.

The next segment of ring 28 to come beneath brush 47 is segment 35. This segment being connected with contact ring 31, with which brush 46 engages, is connected thereby with contact 41 on the minute arm, which contact operates over the sixty segments of segment ring 38. Upon reference to Fig. 6, it will be seen that contact 41, in the exemplary time given, is occupying segment 8 of the second group of segments in ring 38. Therefore, upon engagement of brush 47 with segment 35 of ring 28, the lamp which occupies ninth position and which is connected with terminal 8 of terminal strip 43, will become illuminated. This illumination will produce a beam of light from the ninth lens tube 23, which will impinge the cylinder 11 upon the ninth sound track thereon, which sound track is a recording of the number "8". Therefore this sound track recording the word "eight" will be caused to function its cooperating one of the photoelectric cells 19, to cause amplifier A to produce an audible "eight". Continued rotation of the cylinder 11 and commutator ring 28 will bring segment 35 from beneath brush 47, thereby causing the lamp connected with terminal 8 to be extinguished, thus resulting in a cessation of the spoken word "eight". There is next presented to the brush 47, segment 36 of commutator ring 28, which segment has not been shown connected with any of the contact rings, although it may be connected with a ring such as 32 for giving a bell or buzzer indication of the fact that the spoken time indication has ceased and will be repeated immediately following a cessation of this pause signal. However, we have not shown segment 36 as having been connected in any way for this purpose, thereby indicating that a silent or rest period shall expire before another repetition of the time indication.

After segment 36 passes from beneath brush 47 segment 33 comes into place beneath brush 47. In view of the fact that the contact 40 of the "hour" contact arm occupies segment 12 of the hour segment ring 37, and in view of the fact that contact ring 29 is connected with segment 33 as shown in Fig. 5, brush 41 engaging contact ring 29, which brush is in turn connected with contact 40 of the "hour" contact arm, also, bearing in mind that segment 12 of the hour segment ring 37, is connected with terminal 12 of terminal strip 43, that last one or thirteenth of the lamps 24 will be caused to become illuminated and thereby project a beam of light from the last or thirteenth lens tube onto the voice or sound track which is located on cylinder 11 and occupies that portion of its surface located between the lens tube and the photoelectric cell which co-operates with the illuminated lamp connected with terminal 12. This last sound track on the cylinder having been made to record the word "twelve", it will be caused to operate amplifier A to produce an audible "twelve" at its output.

Now, describing the continued functioning of the apparatus, it will be recalled that we have described the audible or spoken time signal as coming to the subscriber as "one", "eight" and "twelve". It will be observed that because of the intervention of segment 36 of segment ring 28, there is a pause between "one", "eight" and the word "twelve". The subscriber hearing this time indication, given in this manner, would know that "one", "eight" is not the time, because this is followed by the word "twelve". Therefore, he would continue to listen, if he chose to do so, after which he would hear the repetitions of time coming to him in the order of "twelve", "one", "eight" and this would be followed by a pause, indicating that the time is Twelve, Eighteen, This indication would continue throughout the minute to which the indication referred, and would change automatically to "twelve, one, nine", at the next signal to be given, which signal would continue to be repeated as long as the ninteenth minute after twelve was still indicated by the positions of the contacts on the segment of the ring of the clock dial. This indication would continue throughout the minute of each hour until the exact hour or even hour had been reached, at which point the minute contact arm would occupy a position with its contacts 41 and 42 over the two zero segments at the top of the contact rings 38 and 39 as shown in Fig. 6. At this time, these two zeros, also being connected into the circuit, the position of the hour contact arm with its contact 40 occupying any one of the segments "1" to "12" inclusive of the contact ring 37, would result in the voice tracks speaking the numbers indicating the even hour, with minute indication as "zero, zero". However, as soon as the minute contact arm has passed from these zero segments of the minute segment ring 38, and has passed to a point where its contact 41 engages any one of the segments numbered "1" to "9" inclusive within the first group of minute segments included after the hour of "twelve", there would be a time indication given out as "seven, one", "eleven, three", or whatever may be the correct hour and minute after the hour, up to ten minutes after the hour, after which the minute contact arm would have moved to bring its contacts 41 and 42 onto the minute segments comprising the second group of the minute segment ring 38 under the segment 1 of the central ring 39. In this manner the apparatus would function to give the correct time indication, being entirely automatic and in no manner demanding the attention of an operator, other than occasional servicing and checking of the parts of the mechanism of the clock and other details in order to insure reliable and uninterrupted service.

We now refer to the functioning of the apparatus when the fractional minute segment ring is installed in the circuit of the system. Because of the fact that there is a pause between the announcements of the correct time as expressed in words designating the hour and minute, this pause or period of silence is utilized for the purpose of introducing a further announcement giving the fraction of the minute existing at the time. Thus, fractional minute announcements of "one quarter", "one half", and "three quarters" may be made. For this purpose the three narrow metal segments 50 are provided, each controlling the apparatus through the minute hand contact 49 in just such a manner as has been specifically illustrated and described, certain details of the apparatus not being shown because of mere repetition and consequent complication preventing a clear understanding of the invention as explained. It is obvious that the addition of or elimination of the fractional minute announcement features of the apparatus and system we have invented, in no manner affects the inventive thought we have expressed, that these fractional minute announcements may be varied from those suggested, or that they may partake of other characteristics than those which characterize voice signals.

Let it be assumed that the telephone subscriber has an automatic dial phone equipment. In such equipment it is usual that there is a blank space on the dial. If this is not true, then it is not difficult that such space be provided and that it be marked with the letter "T" to indicate time. All the subscriber has to do is to dial by placing his finger in this position and then releasing the dial, as is usual, thereby causing him to be placed in instant communication with the output circuit of the amplifier of our time service system, whereupon he will receive a spoken indication of the correct time. If the subscriber is equipped with a phone having exchange operator service, he merely has to lift the receiver from the hook and, upon receiving his "que" from the operator, to speak the single word "time" into the transmitter, whereupon the operator will immediately plug the subscriber's phone into one of the jacks provided for such service on the switch board and indicated in Fig. 1 of the drawings under the designation of SB and JACK.

When installed in a commercial 'phone system, the subscribers, in order to be entitled to this correct time service, would have their specific jacks or jack numbers designated in a suitable color or by a suitable symbol so that the operator, at a glance, could determine whether the subscriber is entitled to this service or not.

Of course, it is to be understood that various modifications of the apparatus described herein may be incorporated without departing from the spirit and scope of the invention which we have just set forth and which is developed in the following claims.

Having thus described our invention what we claim is:

1. In combination, a telephone circuit and a time service system, said system comprising a series of voice records, a source of light for illumination of each of said records, a light sensitive agency responsive to illumination of each of said records, timed selective means effecting illumination of desired ones of said records, amplifying apparatus connected with the telephone circuit and for cooperation with the light sensitive agency, said selective means including a commutator comprising a series of collector rings continuously connected with the voice records, a selector ring having segments in number equal to the collector rings and connected therewith one ring to a segment, and electric connections for the light sensitive agencies with the amplifying apparatus, whereby time announcement may be made when said system is associated with a telephone circuit.

2. In a time service system, a series of voice records of the hours and minutes, a source of light for illumination of each of said records, a light sensitive agency responsive to illumination of each of said records, time selective means effecting illumination of desired ones of said records, amplifying apparatus for cooperation with the light sensitive agency, said selective means including an hour and minute recorder connected with said respective sources of light according to the hour and minute recorded in the records and recorder, a commutator comprising a series of collector rings connected with the recorder according to the hours and minutes recorded thereby, a selector ring having segments in number equal to the collector rings and connected therewith one ring to a segment, and electric connections comprising two portions, one portion connecting the light sources, recorder and commutator, and the other portion connecting the light sensitive agencies and amplifying apparatus.

GEORGE DALTON MYERS.
DONALD H. MYERS.